United States Patent
Jessen et al.

(10) Patent No.: US 6,772,863 B2
(45) Date of Patent: Aug. 10, 2004

(54) BRAKE APPLIANCE FOR GEROTOR MOTORS

(75) Inventors: Christian Jessen, Soenderborg (DK); Tom Tychsen, Graasten (DK)

(73) Assignee: Sauer-Danfoss (Nordborg) A/S (DK)

( * ) Notice: Subject to any disclaimer, the term of this patent is extended or adjusted under 35 U.S.C. 154(b) by 0 days.

(21) Appl. No.: 10/274,905

(22) Filed: Oct. 21, 2002

(65) Prior Publication Data

US 2004/0074707 A1 Apr. 22, 2004

(51) Int. Cl.[7] .............................................. F16D 55/36
(52) U.S. Cl. ................... 188/71.5; 188/170; 188/106 F
(58) Field of Search ................. 188/71.5, 170, 188/106 F, 72.3, 73.31, 72.4, 156, 157

(56) References Cited

U.S. PATENT DOCUMENTS

| | | | | |
|---|---|---|---|---|
| 3,927,737 A | * | 12/1975 | Prillinger et al. | 188/106 F |
| 4,023,654 A | * | 5/1977 | Winzeler | 188/170 |
| 4,560,034 A | * | 12/1985 | Windish et al. | 188/72.3 |
| 6,041,896 A | * | 3/2000 | Bohm | 188/71.5 |
| 6,170,616 B1 | * | 1/2001 | White | 188/71.5 |

\* cited by examiner

*Primary Examiner*—Robert A Siconolfi
*Assistant Examiner*—Melanie Torres

(57) ABSTRACT

A brake appliance for gerotor motors has a disc assembly brake comprising interacting discs that are subjected to opposing forces from pressurized fluid in one direction to disengage the discs, and from primary and secondary spring forces in the other direction to engage the discs.

6 Claims, 1 Drawing Sheet

BRAKE APPLIANCE FOR GEROTOR MOTORS

BACKGROUND OF THE INVENTION

Compact earth excavators are usually tilted at an angle of a few degrees, meaning that they are a little higher in the front end than in the back end, when in operation. This will have the effect that slewing of the excavator occurs whenever the slewing torque of the excavator exceeds the resisting torque of the slewing gear. Slewing or swinging is the rotational movement of the superstructure (such as a crane) relative to the undercarriage. A slewing gear or swinging gear is the system, which provides the movement.

In order to increase the resisting torque of the slewing gear, gerotor motors have been made with what is called a tight gear set. This means that the internal gear wheel of the gear set of the motor has to be forced around inside the external gear wheel. However, a tight gear set will only apply resistance against rotation in some positions. What is happening, is:

- Torque is applied to the slewing gear from load in the bucket.
- Pressure inside the motor will try to resist the slewing, but internal leaking of fluid means that only the slewing speed is reduced.
- The tight gear set will add additional resistance against slewing when first resistance position is reached, whereby the slewing is stopped.
- Internal leaking of fluid will reduce the pressure, whereby only the tight gear set will apply resistance against slewing.
- If the tight gear set is not able to resist the slewing, it will move on, until the next resistance position is reached.

A tight gear set can be made with sufficient resistance to resist the slewing. Wear of the gear set will, however, reduce the resistance, and an effective prevention of slewing is only obtained for a short period of the lifetime.

Therefore, a principal object of this invention is to provide a brake appliance for a gerotor motor that will effectively provide an effective braking torque to resist torque of the slewing gear wheel when associated with a gerotor motor driven vehicle susceptible to developing slewing torque.

A further object of this invention is to provide a brake appliance for gerotor motors that has a disc assembly brake comprising interacting discs that are subjected to opposing forces from pressurized fluid in one direction to disengage the discs, and from dynamic forces in the opposite direction to engage the discs.

These and other objects will be apparent to those skilled in the art.

SUMMARY OF THE INVENTION

A brake appliance for gerotor motors to provide resistance to slewing torque imposed upon the output shaft of such a motor includes a disc-type brake involving oppositely disposed interacting braking discs that are subjected to opposing forces from pressurized fluid in one direction to disengage the discs, and from dynamic forces in the opposite direction to engage the discs. The spring forces are provided by a series of spring springs mounted on a slidable piston plate to move the discs into braking engagement with each other.

DESCRIPTION OF THE PREFERRED EMBODIMENT

Figure 1:
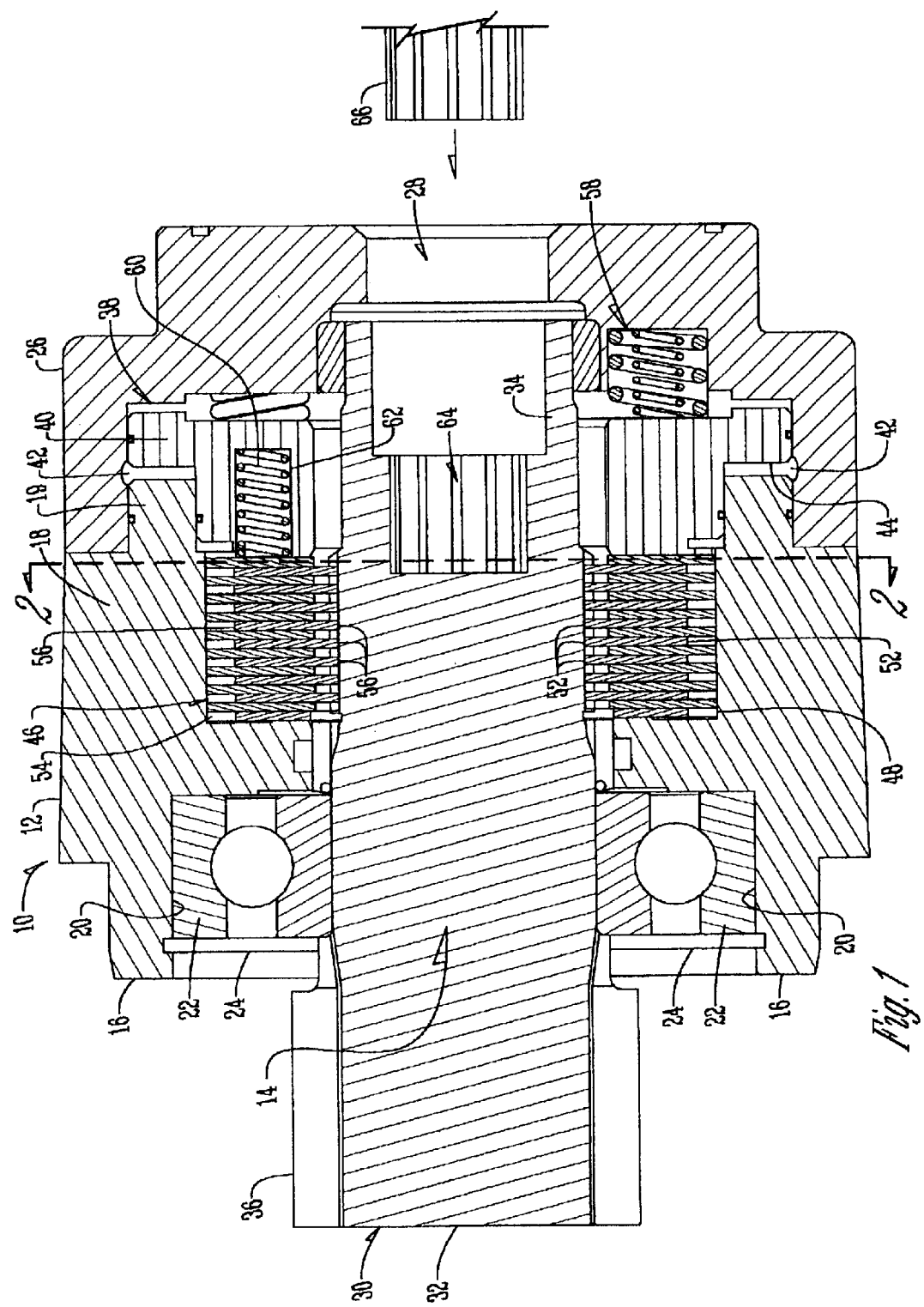
FIG. 1 is a longitudinal sectional view of the device of this invention.

With reference to FIG. 1, the brake appliance 10 has a housing 12 with a center bore 14, an outer end 16, and an inner end 18. An annular shoulder 19 is formed on the inner end 18 of the housing 12. An outer bearing chamber 20 is formed in the outer end of housing 12 and supports bearing 22 which is held in place by a conventional snap ring 24 or the like.

An end cap 26 is positioned against the inner end 18 of housing 12. End cap 26 has a center bore 28 which is in axial alignment with the center bore 14 of housing 12.

An output shaft 30 is rotatably mounted within center bore 14 of housing 12 and is specifically rotatably mounted within the bearing 22. The shaft 30 has an outer end 32, and an inner end 34. A slewing gear wheel 36 is rigidly mounted to the outer end 32 of the shaft 30. An internal annular cavity 38 is formed in end cap 26. A brake piston plate 40 is slidably mounted within cavity 38. A portion of the cavity 38 comprises an annular fluid pressure chamber 42 which is located adjacent the outer face 44 of plate 40.

Brake disc wells 46 and 48 are formed in housing 12 adjacent the center bore 14. The discs 56 having cavities 54 extend into mating relationship with the discs 52 by being located within the spaces between the disc 52. Conventionally, the discs 56 have a width slightly less than the width of the spaces between discs 52 so that the discs 56 are not frictionally engaged with the static discs 52 unless a longitudinal force is exerted upon the discs 56. The outer geometry of the static brake discs 52 is such that it fits with disc wells 46 and 48 in the housing. Similarly, the inner geometry of the rotating brake discs 56 is such that it fits with splines 54 in the shaft 30. The discs 52 extending from the stack towards the housing are the static discs, and the discs 56 extending from the stack towards the shaft are the rotating discs.

A primary spring means 58 is mounted within end cap 26 and bears against brake piston plate 40. The primary spring means 58 serves to engage the brake by forcing the brake disc 56 into frictional engagement with the brake disc 52. Similarly, a plurality of secondary springs 60 located in a spaced circular path in wells 62 in brake piston plate 40 also urge the brake disc 56 into frictional engagement with the brake disc 52.

Thus, primary springs 58, placed in wells in the end cap 26, are acting on the brake piston plate 40, and secondary springs 60, placed in wells in the brake piston plate 40, are acting on the first disc in the brake disc stack, preferably a non-rotating disc. The brake piston plate 40 is free to rotate in the cavity 38, except for friction in the O-ring sealings, but the brake piston plate 40 is not rotating with the rotating part of the brake disc stack.

A splined well 64 is formed on the inner end of shaft 30 and is adapted to conventionally receive the splined end 66 of an output shaft of a gerotor motor (not shown).

The annular fluid pressure chamber 42 is connected to a controllable source of pressurized fluid.

As previously indicated, the rotating discs 56 are placed on a splined connection on the output shaft 30 upon which the slewing gear wheel 36 is placed. The static discs 52 are placed in spline connection in the housing, and the brake piston plate 40 is able to press the static and rotating discs together, thereby forming a brake torque. The primary springs 58 and secondary spring 60 force the braking action of the engaged discs to take place. However, applying fluid pressure to the chamber 42 on the surface 44 of the plate 40 will disengage the braking action. The transmission shaft 66 will fit into the splined well 64 of shaft 30 when the gerotor motor is mounted on the end cap 26 as previously described.

Except for the secondary springs 60, the foregoing structure does not differ from the state of the art. In the present design, the brake piston plate 40 would normally bear against the first static disc 52, and the last static disc 52 would bear against the housing 12. With secondary springs 60, however, the springs 60 will bear against the first static disc 52, when the fluid pressure chamber 42 is pressurized. Conventional disc brakes are made by MICO, the details of which are basic knowledge to persons skilled in hydraulic motors with multi-disc brakes. The advance in the art is represented by the secondary springs 60 and their functional operation. When fluid pressure is supplied to the chamber 42, thus normally disengaging the braking action, the secondary springs 60 will add a force to the engaged discs 52 and 56, creating a torque resistance. Disengaging the brake system by the pressurized fluid will under these circumstances now be impossible. However, shifting between two levels of braking torque is the consequence of applying fluid pressure to the chamber 42. These two levels constitute primary braking torque and secondary braking torque. The number and dimension of the discs 52 and 56 can be varied, but in any event, serve to provide braking torque that can resist the slewing torque imposed upon slewing gear wheel 36. The concept of shifting between a static braking torque with the addition of a secondary braking torque is regarded to be novel.

More specifically, the secondary springs 60 act upon the multi-disc brake and on the brake piston plate 40, thereby adding a force on the two elements away from each other. With hydraulic pressure applied to the fluid pressure chamber 42, the brake piston plate 42 will be forced to the right, (FIG. 1) until it reaches the end cap 26. The secondary springs 60 will, however, still apply a force to the multi-disc brake, and a brake torque is thus still applied to the output shaft 30. This secondary brake torque comes solely from the secondary springs 60.

When hydraulic pressure is released from the fluid pressure chamber 42, the major spring means 58 force the brake piston plate 40 towards the multi-disc brake, hereby increasing the braking torque to a static braking torque. In a conventional disc brake, the first disc and the last disc in the stack are static discs, meaning that they are rotationally fixed with the housing. Between all static discs, there is a rotating disc, meaning that it is rotationally fixed with the output shaft. When the static discs are forced towards each other, friction between static and rotating discs occurs, and as the rotating discs are rotationally fixed to the output shaft, this friction will apply a braking torque on the output shaft.

It is therefore seen that this invention will achieve at least its stated objectives.

What is claimed is:

1. A brake appliance for gerotor motors, comprising, a housing having a center bore, an end cap having a center bore axially aligned with the center bore of the housing and secured to an inner end of the housing, an output shaft rotatably mounted in the center bore of the housing and having an inner end extending into the center bore of the end cap, an internal annular cavity in the end cap, a brake piston plate slidably rotatably mounted in the annular cavity of the end cap and adapted for slight longitudinal movement therein, an annular fluid pressure chamber comprising a port of the annular cavity in the end cap and being located adjacent an outer face of the brake piston plate so that pressurized fluid in the pressure chamber will exert a force on the brake piston plate in an inward direction, two groups of braking members, one group rotatably secured to the housing and the other group rotatably secured to the output shaft, primary spring means between the end cap and the brake piston plate for urging the two groups of braking members into a primary braking condition, secondary spring means between the brake piston plate and the two groups of braking members for urging the braking members into a permanent secondary braking condition, and connection means on the inner end of the output shaft for connection to an output shaft of a gerotor motor.

2. The device of claim 1 wherein the connection means is a spline well for receiving a splined end of an output shaft of a gerotor motor.

3. The device of claim 1 wherein means are provided for applying a measured flow of pressurized fluid to the pressure chamber to selectively change the braking condition in resisting slewing torque imposed on the output shaft.

4. The device of claim 3 wherein a gerotor motor having an output shaft is connected to the inner end of the output shaft rotatably mounted in the center bore of the housing.

5. The device of claim 4 wherein means are provided for applying a measured flow of pressurized fluid to the pressure chamber to selectively change the braking condition in resisting slewing torque imposed on the output shaft through a slewing gear wheel.

6. A brake appliance for gerotor motors, comprising, a housing having a center bore, an end cap having a center bore axially aligned with the center bore of the housing and secured to an inner end of the housing, an output shaft rotatably mounted in the center bore of the housing and having an inner end extending into the center bore of the end cap, an internal annular cavity in the end cap, a brake piston plate slidably rotatably mounted in the annular cavity of the end cap and adapted for slight longitudinal movement therein, an annular fluid pressure chamber comprising a port of the annular cavity in the end cap and being located adjacent an outer face of the brake piston plate so that pressurized fluid in the pressure chamber will exert a force on the brake piston plate in an inward direction, a plurality of spaced annular static brake discs secured to the housing adjacent the inner end of the housing, a plurality of spaced annular rotating brake discs positioned in the spaces between the static brake discs secured to the housing and being connected to the brake piston plate whereby a braking torque will be created between the static and rotating discs when the static and rotating discs are pressed together, primary spring means between the end cap and the brake plate for urging the rotating discs into braking condition with the static discs, secondary springs on the brake plate associated with the rotating discs to permanently resist any force exerted on the brake plate, and connection means on the inner end of the output shaft for connection to an output shaft of a gerotor motor.

* * * * *